April 23, 1935.  C. H. SHARP ET AL  1,999,023
PHOTOELECTRIC COMPARATOR
Filed April 20, 1933
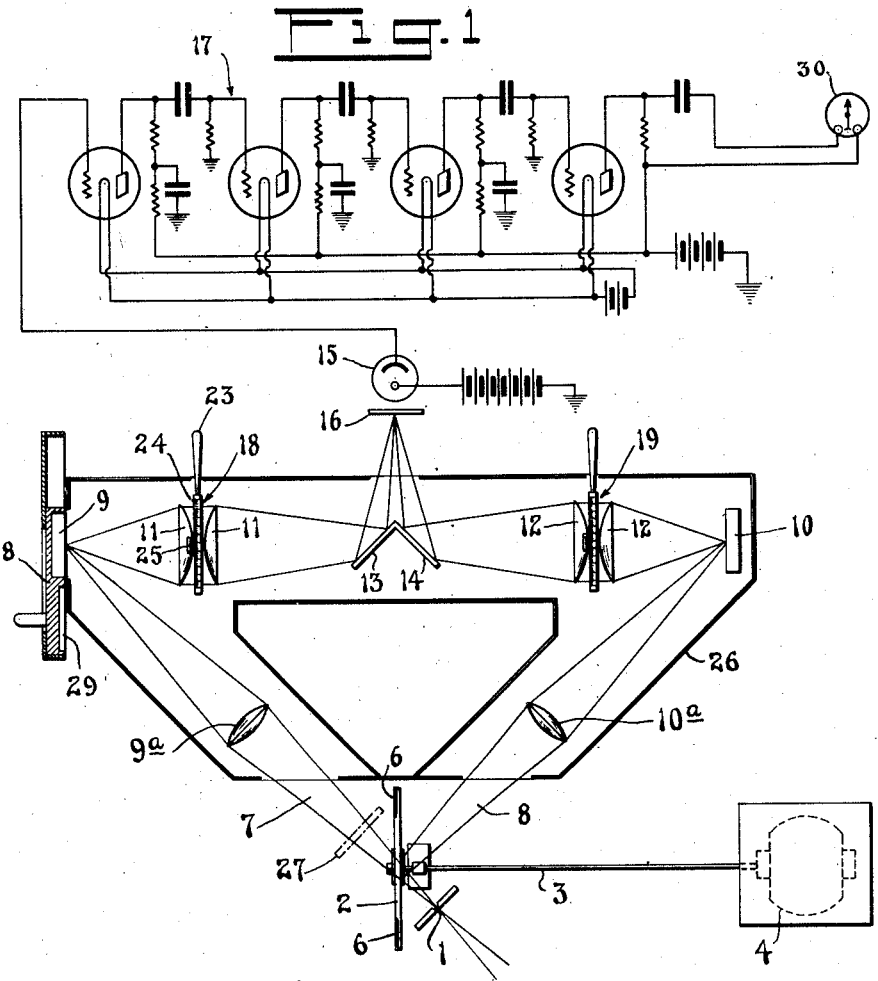
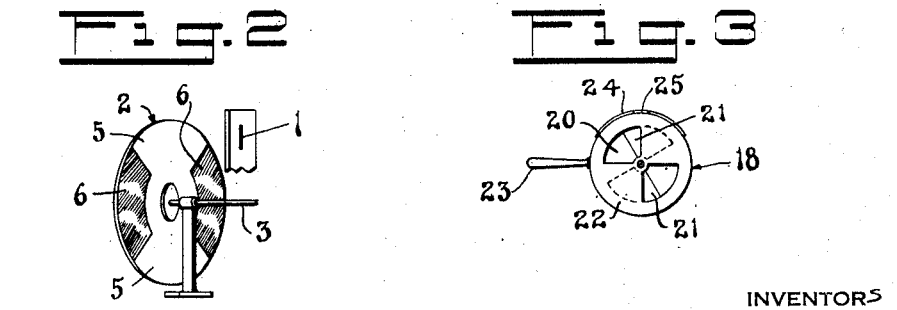
INVENTORS
Stanley H. Sharp
Howard Eckweiler
BY
their ATTORNEY Patented Apr. 23, 1935

1,999,023

UNITED STATES PATENT OFFICE 1,999,023

PHOTOELECTRIC COMPARATOR

Clayton H. Sharp, White Plains, and Howard J. Eckweiler, New York, N. Y., assignors to Electrical Testing Laboratories, New York, N. Y., a corporation of New York Application April 20, 1933, Serial No. 666,988

3 Claims. (Cl. 88—14)

In the application of photoelectric cells to radiometry including photometry the method which is open to the least objection is that in which the photoelectric cell is used simply as an indicator of equality of two beams of light with each other. When so used in photometry the cell replaces the visual photometer and the eye and, because of the greater sensitivity attainable and the absence of the physiological factor, it offers many advantages. The elimination of the influence of the response characteristic of the cell, whether linear or non-linear, and of any variations in the characteristic and the elimination also of the response characteristics of amplifier as well, give this method a certain preeminence over other methods which are not so independent of the cell or amplifier or both.

The device and method here described enable the radiation from a source as, for example, an illuminated slit, to be directed in alternation over two separate paths in one of which the transmitting or reflecting substance may be inserted. A means for diminishing the intensity of the beam in a measured amount is included in one or both of the paths. The two paths are afterwards reunited at the photoelectric cell and a condition of equality is found between the beam which has suffered absorption losses and the beam which has not suffered such losses. In this way the amount of the absorption loss is measured and since both beams are supplied from the same lamp the effect of fluctuations in its intensity is eliminated.

In the comparator here described a photoelectric cell is used as such a detector of equality and a rotating disk is used to split the beam from a single source, rather than to unite beams from two different sources. The current from the photoelectric cell is amplified and a vibration galvanometer, or other suitable device, is used as a detector of current and enables the equality of the response of the cell to the two beams to be determined with high precision.

A further and important advantage is that the apparatus, in spite of its precision characteristics, is so simple to operate that no particular skill or knowledge is required to secure accurate measurements.

One form of the invention which is described in the following specification is illustrated in the drawing, of which—

Figure 1 is a diagrammatic plan view of the device and also contains a diagram of a circuit which may be employed to amplify the currents produced by the photoelectric cell;

Fig. 2 is a diagrammatic view in perspective of the rotating disk by means of which the beam of light is made to pass over two different paths, also showing the position of the light source; and Fig. 3 is a diagrammatic elevation of the shutter utilized to vary the intensity of one or both of the beams of light.

Referring generally to Fig. 1, the comparator consists of a source of light radiation represented by an aperture or slit 1. The light may be white light or any color of a spectrum as produced by a prism or any suitable spectrum-forming device. The light source represented by slit 1 may, of course, be enclosed in a light-tight housing (not shown) in a wall of which the slit or aperture is incorporated.

In front of aperture 1 is positioned a disk 2 rotatably mounted upon a shaft 3 of a motor 4 and at an angle (shown as 45°) to the plane of the aperture 1. Also, as will be seen in Fig. 2, the disk 2 is provided with clear or cut out sections 5 and sections 6 having silvered or other reflecting surfaces in the side opposite aperture 1, the clear and silvered sections being of the same size and shape and alternately and equally spaced around the disk. Four such sections are shown, two clear and two reflecting, but the number may be varied if desired. Disk 2 is so positioned that the light from source 1 will impinge upon these sections.

Motor 4 is preferably of the constant speed type since the disk should be rotated at a constant speed. A four pole, 25 cycle, motor giving, with the four section disk shown, a beam frequency of 25 per second has been found suitable. However other speeds may be employed if desired, as well as a disk having fewer or more sections, depending upon the beam frequency desired.

It will be evident that when disk 2 is rotated the beam will be alternately projected through the clear sections 5 and reflected from reflecting sections 6 and thus will take the two alternate paths diagrammatically designated as 7 and 8 in Fig. 1.

In each of these paths a projecting lens 9ª or 10ª is placed so that an image of the slit will be cast upon a magnesia block 9, in the case of the projected beam, and a magnesia block 10, in the case of the reflected beam. The use of magnesia is not essential. A white surface of high reflecting power is all that is required. In fact a mirror with a sandblasted surface may be used in lieu of block 10 in case more light is needed, excepting for the measurement of reflection factors when a standard of white is required, such as magnesia or an equivalent.

The light from blocks 9 and 10 is assembled by other lenses 11 and 12, respectively, and the beams thus formed cast upon mirrors 13 and 14, respectively. These mirrors are placed so as to reflect the beams onto a photoelectric cell 15 or, preferably, a ground glass diffusing screen 16 directly in front of cell 15.

Photoelectric cell 15 is in the input circuit of a suitable audion amplifier 17, the output of which is delivered to a suitable indicating device 30. A vibration galvanometer is admirably suited for this purpose because it can be tuned to a definite desired frequency, is highly sensitive to that frequency, and relatively insensitive to other frequencies, and is free from static friction.

The amplifier should have a high gain ratio at the tuned frequency because of the small amount of light falling upon the photoelectric cell and the weak currents consequently produced.

Returning to collecting lens systems 11 and 12, a shutter is associated with each, as shown at 18 and 19, of a type by which the light can be altered in a measurable manner—an adjustable quadrant sector shutter, for example, such as that shown diagrammatically in Fig. 3. As is well known, this consists essentially of a stationary disk 20 having quadrant openings 21 therein and a concentric rotatable disk 22 having similar openings so positioned that by rotating it, by means of a handle 23 for example, the openings may be made to coincide or they may be closed to any desired degree, the degree of closing corresponding exactly with the percentage of light cut off. A scale 24, reading preferably from 0 to 100, may be attached to one of the disks and an indicator 25 to the other so that the amount the shutter is open may be read directly, or, in other words, the amount of light which is passing through as compared with the total quantity which the shutter is capable of passing. The device should of course be enclosed as far as practicable in a housing 26 to exclude external light.

For the measurement of transmission factors the object to be measured is inserted in the path of one of the beams as shown diagrammatically at 27. For the measurement of reflection factors the object 29 is substituted for one of the magnesia blocks, say block 9. To facilitate this a slide 28 may be provided to carry the magnesia block 9 and also the object 29. By simply positioning the object to be measured in the slide, it, or the magnesia block 9, may be positioned at the focus of lens 9 as desired.

As illustrating the method of operation let it be supposed that a transparent object is to be measured to determine its transmission coefficient either with white light or with one of the colors of the spectrum. This object is interposed in the left-hand beam as shown in the diagram. The measuring sector disk 18, furnished with a scale graduated from 0 to 100 in equal divisions, the 100 point corresponding to the wide open sectors, is set at division 100 with the object in place. The sector 19 in the right-hand beam is opened or closed until the beam produces an effect equal to that of the left-hand beam as indicated by a zero reading of the vibration galvanometer 30. The object is then removed from the beam and the left-hand measuring sector 18 is adjusted until equality of effect of the beams has again been established. Assume, for instance, that the setting of the sector 18 is then at 60 on the scale. This indicates that the coefficient of transmission of the object for the light in question is 60 per cent.

In this operation the right-hand beam serves as a comparison standard which shows that the amount of light transmitted by the sector in the second part of the operation is just equal in effect upon the photoelectric cell to the amount of light transmitted by the object with wide open sector. When the object is taken out, the sector is closed to bring the beam effect again to equality and the amount of closure measures the amount of light which the object has absorbed. The method is a substitution method in accordance with the best radiometric practice. For homogeneous light the value obtained is independent of the reflecting qualities of either of the magnesia blocks or of the equality of their reflection factors. It is also independent of their color and of the color characteristic or sensitivity of the photoelectric cell, or of the sensitivity of the amplifier, as long as these are sufficient.

If reflection factors are to be measured the object is placed alongside the magnesia block in slide 28 as explained. The procedure then is to slide the reflection test object into the place occupied in Fig. 1 by magnesia block 9, a location where the image of the slit will be formed upon it. The measuring sector 18 is then set at 100 division and the beams are balanced by manipulating the right-hand sector disk 19. Next, the magnesia block 9 is slid into place so that the image falls upon it and the balance is restored by closing the left-hand measuring sector 18.

The reading of the scale 24 of this sector then gives the reflection factor for the sample in terms of the reflection factor of the magnesia and under conditions of 45-degree incidence and normal viewing which is generally adopted in work of this kind. In this case the reflection factor of the magnesia block comes into the answer, this surface serving as the standard of reflection factor. The preferred procedure in preparing such a block is to smoke a slab of magnesium carbonate with magnesium oxide from a burning magnesium ribbon. The reflection factor of such a surface is known to be between 98 and 99 per cent.

The comparator may be used for still other purposes, for example, the determination of the contrast ratio of printing papers, the reflection from such a paper being measured first with a white background and next with a black background. It is also adapted to the purposes of microphotography as in measuring the relative intensity of spectrum lines on a photographic plate. For this purpose a sharp image of the slit must be focused onto the photographic plate which then serves as the transmission sample. By refocusing the left-hand projection lens, the image of the plate is focused on magnesia block 9 and the measurement proceeds as before.

It is not essential that the exact routine of measurement as mentioned above should be used. For instance, measurements may be carried out as follows:—With the object out and with the left-hand sector disk 18 set at 100 the light may be balanced by an adjustment of the right-hand sector disk 19, white against white. Then, if the sample is inserted into the right-hand beam the amount of its absorption is measured by the amount by which it is necessary to cut down the left-hand sector disk 18.

If in spectroradiometry with this device it were possible to obtain an exact balance by the light from the two magnesia blocks with no test object interposed with all colors of the spectrum and to maintain this condition, the process of measurement could be simplified by the elemination of one of the two settings mentioned in the previous description. However, it has been found in practice that the response from the one magnesia block does not balance that from the other magnesia block at all times and at all wavelengths with the same sector openings. Hence, this procedure can be followed only when approximate measurements are required.

The instrument and method are simple, precise and rapid. It can be used by an operator without scientific training. As compared with curve-drawing spectroradiometers it possesses the advantage of much higher precision. At the same time, in cases where it is necessary to pick the points off the curve of a curve-drawing spectrophotometer for the purpose of introducing corrections to make the precision comparable to the precision easily attainable with this instrument, the time so used may more than compensate for the advantage of a directly drawn curve. Its other advantages have been mentioned heretofore.

It will be understood of course that the invention is not limited to the embodiment selected for purposes of explanation.

The term "light" as used in the specification and claims includes not only radiations whch are actually visible to the eye, but also ultra-violet and infra-red radiations—in short, all radiations detectable by the photoelectric cell.

What we desire to secure by United States Letters Patent is:

1. In a photoelectric comparator for measuring the light absorbing factor of an object, means for producing two divergent beams of light in rapid alternation from a single light source, means for producing an image of the light source upon a surface in the path of each beam, means for directing the light from each image upon a photoelectric cell, means for reducing in a measured amount the light from each image, means on said reducing means for determining such reduction directly and quantitatively, and means associated with the photoelectric cell for determining when the currents produced are equal.

2. In a photoelectric comparator for measuring the light absorbing factor of an object, means for producing two divergent beams of light in rapid alternation from a single light source, means for producing an image of the light source upon a surface in the path of each beam, means for gathering the light from each image and directing it upon a photoelectric cell, means for reducing in a measured amount the light so gathered, means on said reducing means for determining such reduction directly and quantitatively and means associated with the photoelectric cell for determining when the currents produced are equal, said last mentioned means comprising an audion amplifier, the input of which is derived from the photoelectric cell and having in its output circuit a tunable vibration galvanometer which is highly sensitive to electrical impulses of the frequency to which it is tuned and relatively insensitive to electrical impulses of other frequencies.

3. In a photoelectric comparator, means for producing a beam of light from a light source, a rotatable disk having transmitting and reflecting sections disposed in the path of said beam so as to cause it to pass over two separate paths in rapid alternation, means for rotating said disk, a surface in each path consisting of a magnesia block, means for focusing the image of the beam upon the respective blocks, means for directing the light reflected from each block upon a photoelectric cell, means for varying the intensity of the light reflected from each block, and means on the varying means for determining by direct reading the proportionate intensity of the light passing through it.

CLAYTON H. SHARP.
HOWARD J. ECKWEILER.